United States Patent [19]

Hyodo

[11] Patent Number: 4,691,932
[45] Date of Patent: Sep. 8, 1987

[54] FOUR-WHEEL STEERING SYSTEM FOR AUTOMOTIVE VEHICLES

[75] Inventor: Youichi Hyodo, Toyota, Japan

[73] Assignee: Toyota Jidosha Kabushiki Kaisha, Japan

[21] Appl. No.: 869,891

[22] Filed: Jun. 3, 1986

[30] Foreign Application Priority Data

Jun. 4, 1985 [JP] Japan ............................ 60-84400[U]

[51] Int. Cl.⁴ ............................................. B62D 3/02
[52] U.S. Cl. ..................................... 280/91; 280/99; 74/831; 74/496
[58] Field of Search ........................ 180/79.1, 79.3, 79; 280/91, 98, 99, 103; 74/831, 496, 110, 89.11, 89.15

[56] References Cited

U.S. PATENT DOCUMENTS

| | | | |
|---|---|---|---|
| 3,716,110 | 2/1973 | Fonda | 180/79 |
| 4,105,086 | 8/1978 | Ishii et al. | 280/91 |
| 4,313,514 | 2/1982 | Furukawa et al. | 280/91 |

FOREIGN PATENT DOCUMENTS

| | | |
|---|---|---|
| 59-26363 | 2/1984 | Japan . |
| 59-26364 | 2/1984 | Japan . |
| 59-26365 | 2/1984 | Japan . |
| 92261 | 5/1984 | Japan .................................... 180/79 |

*Primary Examiner*—John J. Love
*Assistant Examiner*—Karin L. Ferrite
*Attorney, Agent, or Firm*—Parkhurst & Oliff

[57] ABSTRACT

A four-wheel steering system for an automotive vehicle includes a linkage drivingly connected at its front end to a front wheel steering mechanism, and a connecting mechanism assembled in combination with a rear wheel steering mechanism to drivingly connect the linkage to a pair of operation rods of the rear wheel steering mechanism in such a manner that the operation rods are axially displaced in response to movement of the linkage to steer a pair of dirigible rear road wheels. The connecting mechanism is designed to control the steering angle and direction of the rear road wheels relative to those of a pair of dirigible front road wheels without causing any change in the alignment of the rear road wheels.

6 Claims, 5 Drawing Figures fig
FOUR-WHEEL STEERING SYSTEM FOR AUTOMOTIVE VEHICLES

BACKGROUND OF THE INVENTION

1. Field of the Invention

The present invention relates to a steering system for an automotive vehicle having two pairs of dirigible road wheels, and more particularly to a rear wheel steering mechanism adapted for use in a four-wheel steering system capable of steering the dirigible rear road wheels in response to steering operation of the dirigible front road wheels.

2. Description of the Prior Art

In such a four-wheel steering system as described above, there is provided a linkage such as a rotary shaft or a reciprocable link arranged in a fore-and-aft direction of the vehicle and drivingly connected at its front end to a front wheel steering mechanism to be moved in response to steering operation thereof, and a connecting mechanism arranged to drivingly connect the linkage to an operation rod of a rear wheel steering mechanism in such a manner that the operation rod is displaced in an axial direction in response to movement of the linkage to steer the dirigible rear road wheels. In Japanese Patent Early Publications Nos. 59-26363, 59-26364 and 59-26365, there has been proposed such a connecting mechanism adapted for use in combination with the rear wheel steering mechanism, wherein the connecting mechanism is designed to vary the ratio of the steering angle of the rear road wheels relative to that of the front road wheels and to vary the steering direction of the rear road wheels relative to that of the front road wheels. The connecting mechanism includes an input shaft in drive connection to the linkage for rotation therewith, an output shaft swingably connected at its one end to the input shaft by means of a universal joint and being integrally connected at its other end with an operation rod of the rear wheel steering mechanism, and drive means arranged to incline the output shaft with respect to the input shaft. In operation of the connecting mechanism, an inclined angle of the output shaft with respect to the input shaft is controlled by activation of the drive means to vary the steering angle ratio and direction of the rear road wheels. In such control of the output shaft, however, the operation rod of the rear wheel steering mechanism is inevitably displaced in an axial direction even when the input shaft is being stationary. This causes change in the alignment, particularly toe-in, of the rear road wheels, resulting in deterioration of the steering stability of the vehicle.

SUMMARY OF THE INVENTION

It is, therefore, a primary object of the present invention to provide an improved connecting mechanism adapted for use in combination with the rear wheel steering mechanism, wherein the steering angle and direction of the rear road wheels relative to those of the front road wheels can be controlled without causing any change in the alignment of the rear road wheels.

A secondary object of the present invention is to provide an improved connecting mechanism, having the above-described characteristics, wherein the ratio of the steering angle of the rear road wheels relative to that of the front road wheels can be controlled in accordance with the vehicle speed.

According to the present invention, the foregoing objects are accomplished by providing a connecting mechanism assembled in combination with the rear wheel steering mechanism and being drivingly connected to the front wheel steering mechanism through a linkage for effecting axial movement of an operation rod of the rear wheel steering mechanism in response to operation of the front wheel steering mechanism. The connecting mechanism comprises a housing arranged to fixedly mounted on a body structure of the vehicle, a carrier rotatably mounted within the housing and being arranged to rotate about a first axis perpendicular to the axis of the operation rod, drive means mounted on the housing to effect rotary motion of the carrier about the first axis, a bell crank rotatably mounted on the carrier and arranged to rotate about a second axis coaxial or in parallel with the axis of the operation rod when the carrier is retained in a neutral position, the bell crank having a first arm extending therefrom at a predetermined angle to the first axis and a second arm extending therefrom along the first axis, a first link having one end pivotally connected with the first arm of the bell crank and the other end operatively connected to the linkage to be moved along the first axis in response to operation of the front wheel steering mechanism, and a second link pivotally connected with the second arm of the bell crank and operatively connected to the operation rod.

Preferably, the connecting mechanism further comprises an input shaft rotatably mounted within the housing and being drivingly connected to the front wheel steering mechanism through the linkage to be rotated in response to operation of the front wheel steering mechanism, and a slider slidably mounted within the housing along the first axis and pivotally connected to the other end of the first link, the slider being operatively connected to the input shaft to be reciprocated along the first axis in response to rotation of the input shaft.

BRIEF DESCRIPTION OF THE DRAWINGS

Additional objects, features and advantages of the present invention will become more readily apparent from the following detailed description of preferred embodiments thereof when taken together with the accompanying drawings, in which.

DETAILED DESCRIPTION OF THE PREFERRED EMBODIMENTS

Figure 1:
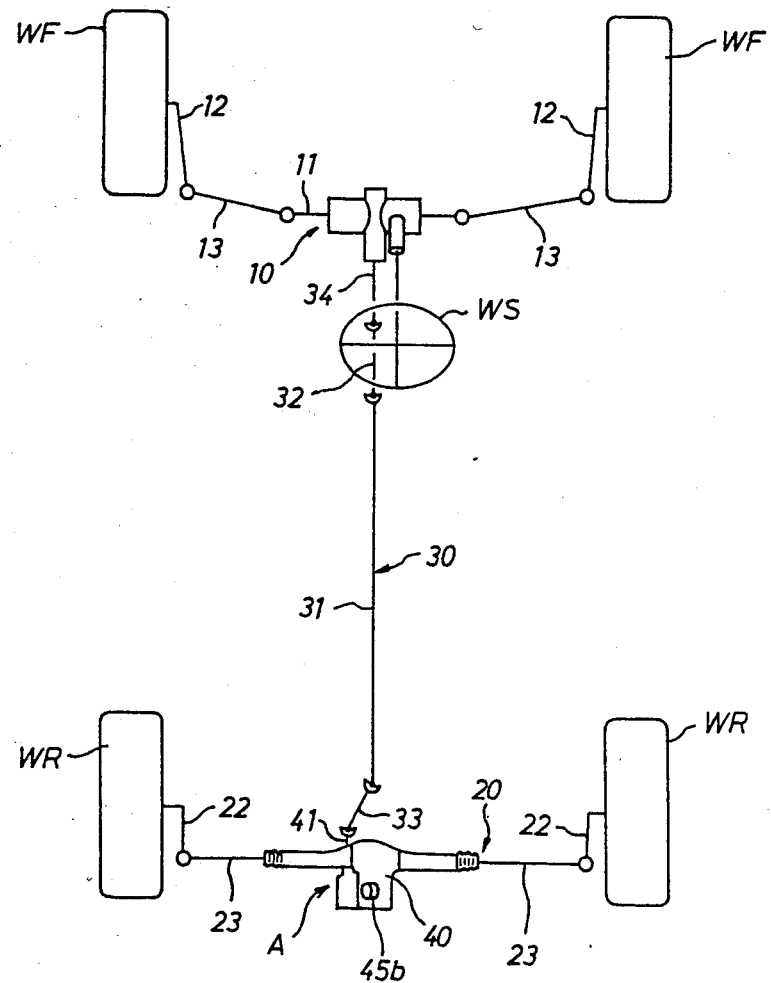
FIG. 1 is a schematic plan view of a four-wheel steering system including a connecting mechanism assembled in combination with a rear wheel steering mechanism in accordance with the present invention.
Figure 2:
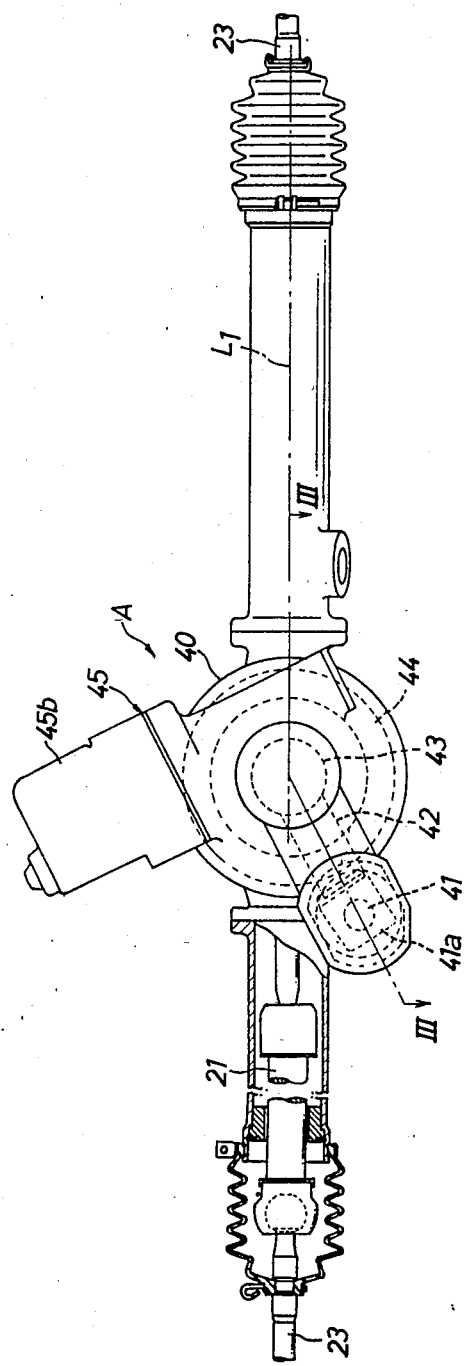
FIG. 2 is a rear elevation of the connecting mechanism shown in FIG. 1.
Figure 3:
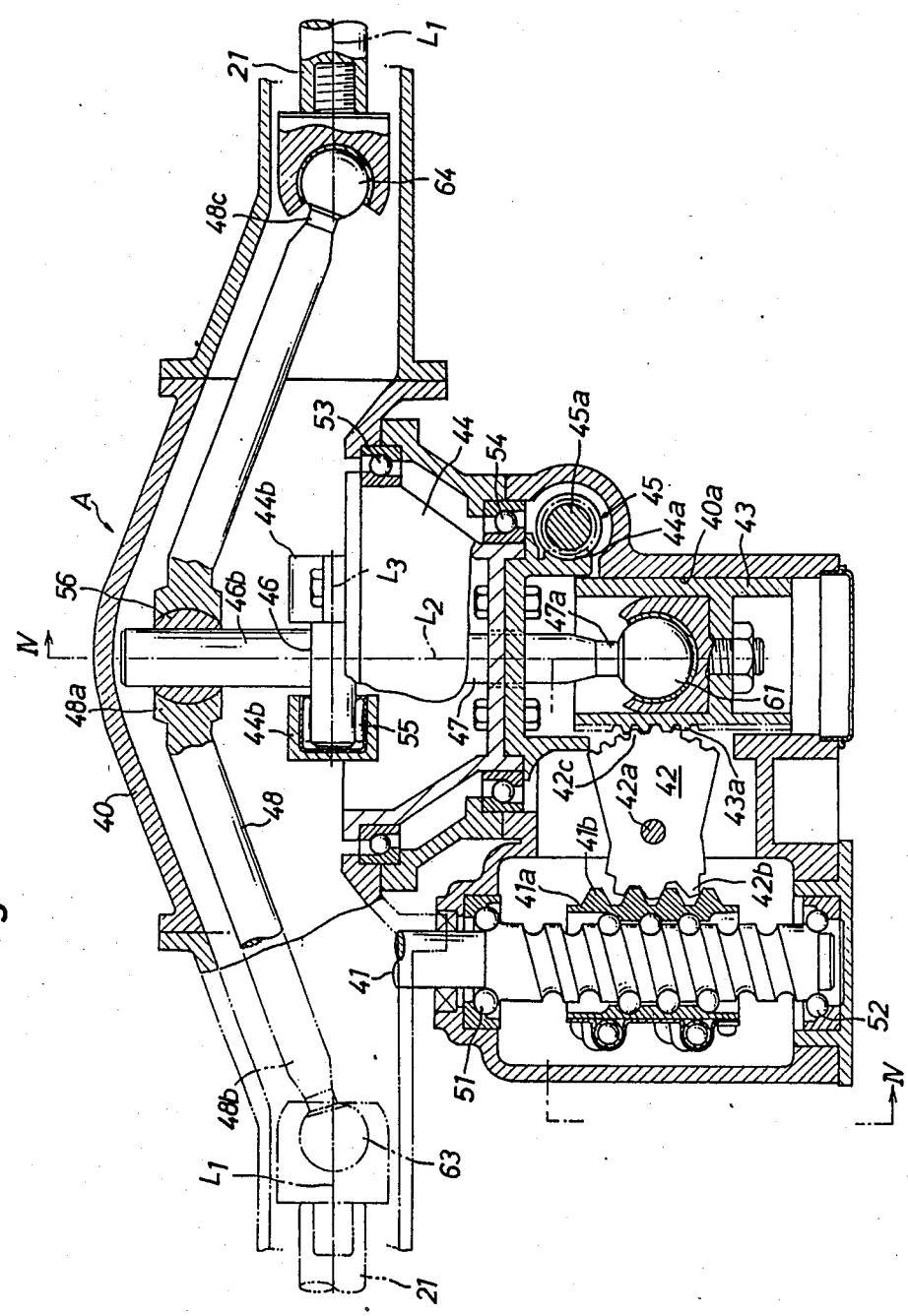
FIG. 3 is an enlarged cross-sectional plan view taken along line III—III in FIG. 2.

Referring now to the drawings, particularly in FIG. 1, there is schematically illustrated an automotive vehicle equipped with a four-wheel steering system which comprises a front wheel steering mechanism 10 interconnected with a rear wheel steering mechanism 20 by means of a linkage 30. The front wheel steering mechanism 10 is in the form of a well-known steering mechanism which includes a rack bar 11 arranged to be axially displaced by operation of a steering wheel WS, a pair of tie rods 13 each connected to opposite ends of rack bar 11, and a pair of knuckle arms 12 each connected to the tie rods 13 to steer a pair of dirigible front road wheels WF in response to axial displacement of the rack bar 11. As shown in FIGS. 1 to 3, the rear wheel steering mechanism 20 includes a pair of operation rods 21 arranged to be displaced along with a lateral axis $L_1$, a pair of tie rods 23 each connected to the operation rods 21, and a pair of knuckle arms 22 each connected to the tie rods 23 to steer a pair of dirigible rear road wheels WR in response to axial movement of the operation rods 21.

The linkage 30 includes a main rotary shaft 31 arranged in a fore-and-aft direction of the vehicle and rotatably supported on a body structure of the vehicle. The main rotary shaft 31 has one end drivingly connected to a front pinion shaft 34 through an intermediate shaft 32 and the other end drivingly connected through an intermediate shaft 33 to a connecting mechanism A assembled in combination with the rear wheel steering mechanism 20. The front pinion shaft 34 is drivingly connected to the rack bar 11 to be rotated in response to axial displacement of the rack bar 11.

As shown in FIGS. 1 to 4, the connecting mechanism A comprises a housing 40 fixedly mounted on the vehicle body structure, an input shaft 41 rotatably supported by a pair of axially spaced ball bearings 51, 52 mounted within housing 40 and being arranged in drive connection to the linkage 30, a sector gear 42 pivotally mounted within housing 40 at its axis part 42a, a slider 43 axially slidably mounted within a cylindrical bore 40a of housing 40 the axis $L_2$ of which is located in the fore-and-aft direction of the vehicle and perpendicularly to the axis $L_1$ of operation rods 21, a cylindrical carrier 44 rotatably supported by a pair of axially spaced ball bearings 53, 54 mounted within housing 40 and being arranged to rotate about the axis $L_2$ of slider 43, and a drive means 45 mounted on the housing 40 to effect rotary motion of the carrier 44. The connecting mechanism A further comprises a bell crank 46 rotatably supported by a pair of axially spaced needle bearings 55 which are coupled within a pair of axially spaced brackets 44b of carrier 44, a first link 47 arranged between slider 43 and bell crank 46, and a second link 48 arranged between operation rods 21 and operatively interconnected to bell crank 46.

Figure 4:
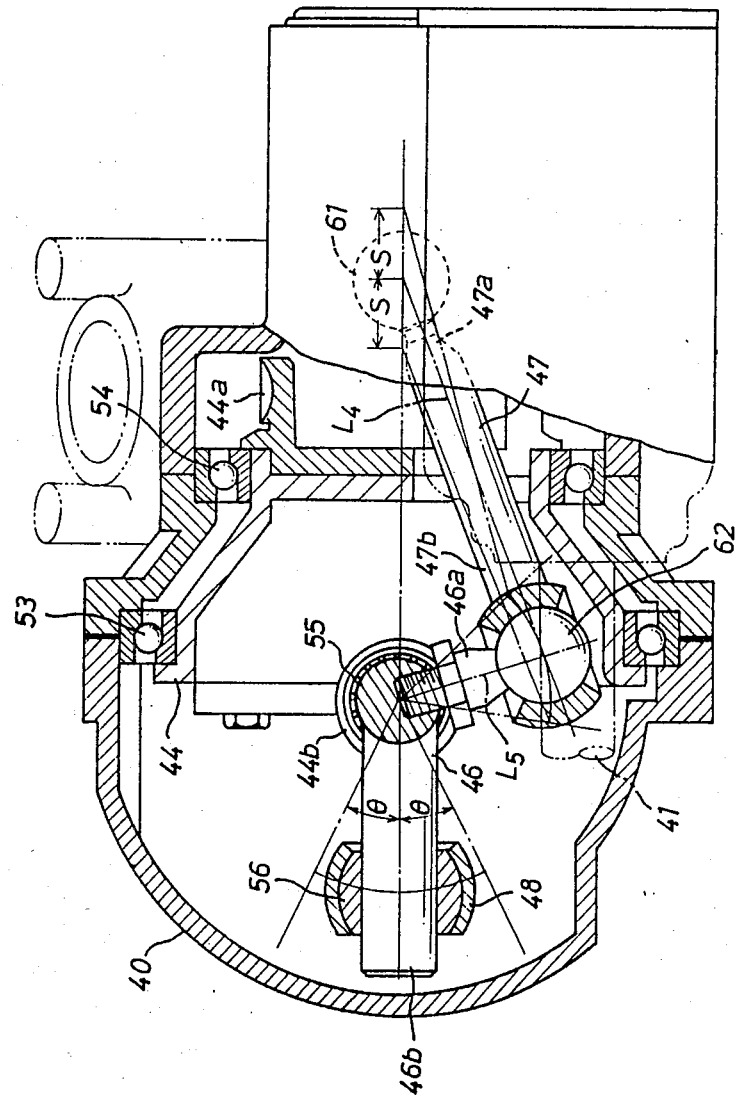
FIG. 4 is a fragmentary cross-sectional side view taken along line IV—IV in FIG. 3.

As shown in FIG. 3, the input shaft 41 is provided thereon with a ball nut 41a which has a rack portion 41b in mesh with a toothed portion 42b of sector gear 42. The slider 43 is in the form of a cylindrical piston which is formed at one side thereof with a rack portion 43a in mesh with another toothed portion 42c of sector gear 42. The carrier 44 has a cylindrical gear member secured to the rear end thereof and formed with a toothed portion 44a. The drive means 45 includes a pinion 45a in mesh with the toothed portion 44a of the cylindrical gear member, and a reversible electric motor 45b mounted on the housing 40 and drivingly connected to pinion 45a to effect rotary motion of the carrier 44 in accordance with the vehicle speed. When the front and rear wheel steering mechanisms 10 and 20 each are conditioned in a neutral position to maintain straight travel of the vehicle, the drive means 45 is conditioned to retain the carrier 44 in a neutral position where a rotational axis $L_3$ of bell crank 46 coincides with the axis $L_1$ of operation rods 21. As shown in FIG. 4, the bell crank 46 is integrally provided with first and second arms 46a, 46b which are arranged to respectively extend downward and along the axis $L_2$ of slider 43 when the carrier 44 is being retained in the neutral position.

The first link 47 has a rear end 47a pivotally connected with slider 43 by means of a ball joint 61 and a front end pivotally connected with a swingable end of first arm 46a of bell crank 46 by means of a ball joint 62. In this embodiment, the first link 47 is arranged in such a manner that when the carrier 44 is retained in the neutral position, an axis line $L_4$ between respective centers of ball joints 61 and 62 makes an angle of approximately 90° with an axis line $L_5$ between the rotational axis $L_3$ of bell crank 46 and the center of ball joint 62. The second link 48 has a central portion 48a slidably and pivotally connected with the second arm 46b of bell crank 46 through a spherical bearing 56 and opposite ends 48b, 48c each pivotally connected with the operation rods 21 by means of ball joints 63 and 64 located on the axis $L_1$.

Hereinafter, the operation of the four-wheel steering system will be described in detail. When the steering wheel WS is operated to turn the vehicle to the right or left, the rack bar 11 is displaced in a lateral direction to steer the front road wheels WF and to rotate the input shaft 41 of connecting mechanism A through the linkage 30. Assuming that the carrier 44 is being retained in the neutral position during rotation of the input shaft 41, the rotational axis $L_3$ of bell crank 46 is maintained to coincide with the axis $L_1$ of operation rods 21. In such a condition, the sector gear 42 is rotated counterclockwisely or clockwisely in response to rotation of the input shaft 41 to effect forward or backward movement of the slider 43, and in turn, the bell crank 46 is rotated clockwisely or counterclockwisely, as viewed in FIG. 4. This causes only a conical motion of second link 48 about the axis $L_1$ of operation rods 21 but does not cause any lateral movement of second link 48. It is, therefore, able to retain the rear road wheels WR in their neutral positions even when the front road wheels WF are steered to the right or left.

Assuming that the drive means 45 is activated to rotate the carrier 44 counterclockwisely by 90°, the rotational axis $L_3$ of bell crank 46 makes an angle of 90 with the axis $L_1$ of operation rods 21. In such a condition, the bell crank 46 is rotated counterclockwisely or clockwisely in response to forward or backward movement of the slider 43, as viewed in FIG. 3. This causes leftward or rightward displacement of second link 48 along the axis $L_1$ of operation rods 21 to steer the rear road wheels WR to the right or left. It is, therefore, able to steer the rear road wheels WR in the same direction as that of the front road wheels WF. The above-described operation is effected in a condition 25 where the rotational axis $L_3$ of bell crank 46 is inclined rightward at an angle with respect to a standard plane including the axis $L_1$ of operation rods 21 and the rotational axis $L_2$ of carrier 44. In general, a common plane in parallel with the standard plane may be defined as a standard plane. In addition, the ratio of the steering angle of the rear road wheels WR relative to that of the front road wheels WF is determined by the inclined angle of the rotational axis $L_3$ of bell crank 46 to the axis $L_1$ of operation rods 21 and becomes a maximum value when the inclined angle is 90°.

Assuming that the drive means 45 is activated to rotate the carrier 44 clockwisely from the neutral position by 90°, the rotational axis $L_3$ of bell crank 46 makes an angle of 90° with the axis $L_1$ of operation rods 21. In such a condition, the bell crank 46 is rotated clockwisely or counterclockwisely in response to forward or backward movement of the slider 43, as viewed in FIG. 3. This causes rightward or leftward displacement of second link 48 along the axis $L_1$ of operation rods 21 to steer the rear road wheels WR to the left or right. It is, therefore, able to steer the rear road wheels WR in an opposite direction to that of the front road wheels WF. This operation is effected in a condition where the rotational axis $L_3$ of bell crank 46 is inclined leftward at an angle with respect to the standard plane including the axis $L_1$ of operation rods 21 and the rotational axis $L_2$ of carrier 44. In addition, the ratio of the steering angle of the rear road wheels WR relative to that of the front road wheels WF is determined by the inclined angle of the rotational axis $L_3$ of bell crank 46 to the axis $L_1$ of operation rods 21 and becomes a maximum value when the inclined angle is 90°.

In a practical embodiment of the present invention, it is desirable that the electric motor 45b of drive means 45 is controlled to rotate the carrier 44 about the axis $L_2$ of slider 43 in accordance with the vehicle speed. With such control of the electric motor 45b of drive means 45, the direction and angle of the rotational axis $L_3$ of bell crank 46 can be varied to control the steering angle ratio and direction of the rear road wheels WF relative to the front road wheels WF in accordance with the vehicle speed. When the carrier 44 is rotated in a condition shown in the figure to vary the direction and angle of the rotational axis $L_3$ of bell crank 46, the bell crank 46 rotates with carrier 44 to cause a conical motion of the first link 47 with an apex at ball joint 61, while the second link 48 is retained in position to avoid lateral movement of the operation rods 21 along the axis $L_1$. This is effective to ensure the steering stability of the vehicle without causing any change in the alignment of rear road wheels WR.

Furthermore, in the above embodiment, the first arm 46a of bell crank 46 is connected to the first link 47 in such a manner that the axis line $L_4$ between ball joints 61, 62 makes an angle of approximately 90° with the axis line $L_5$ between the rotation axis $L_3$ of bell crank 46 and the center of ball joint 62, and the second arm 46b of bell crank 46 is axially slidably coupled with the central portion 48a of second link 48. With such arrangement of the bell crank 46, a rotation angle $\theta$ of second arm 46b caused by forward movement of first link 47 in a predetermined distance S becomes substantially equal to a rotation angle $\theta$ of second arm 46b caused by backward movement of first link 47 in the same distance S. As a result, in operation of the rear wheel steering mechanism 20, the axial movement amount of operation rods 21 in one direction caused by rotation of the input shaft 41 can be made substantially equal to that of operation rods 21 in the opposite direction caused by reverse rotation of the input shaft 41.

In practical embodiments of the present invention, the connecting mechanism A may be modified as follows.

(1) Although in the embodiment described above the input shaft 41, sector gear 42 and slider 43 have been provided to effect axial movement of the first link 47 in response to rotation of the main rotary shaft 31 of linkage 30, the linkage 30 may be replaced with a reciprocable linkage to directly effect axial movement of the first link 47 in response to operation of the front wheel steering mechanism 10. In such a modification, it is possible to eliminate the input shaft 41, sector gear 42, slider 43 and the component parts associated therewith.

Figure 5:
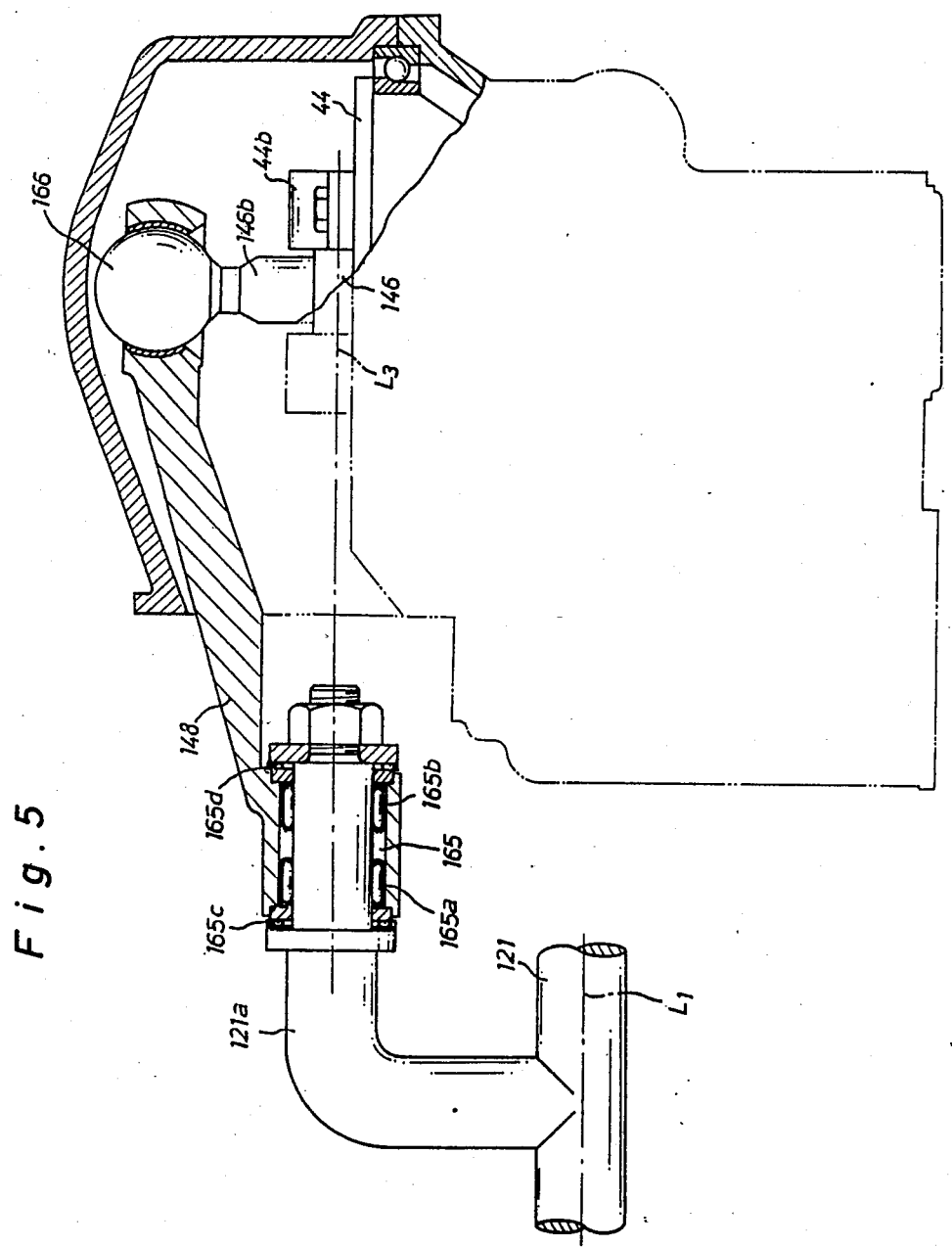
FIG. 5 is an enlarged fragmentary cross-sectional plan view of a modification of the connecting mechanism.

(2) Although in the embodiment described above, the second link 48 has been provided to connect the second arm 46b of bell crank 46 to the pair of operation rods 21, the operation rods 21 may be replaced with a single operation rod 121 as shown in FIG. 5. In such a modification, the operation rod 121 is connected at opposite ends thereof with the tie rods 23 shown in FIG. 1, and the second link 48 is replaced with an arm member 148 which is connected at one end thereof with an arm 121a of operation rod 121 through a pin joint 165 and pivotally connected at the other end thereof with a second arm 146b of a bell crank 146 by means of a ball joint 166. The pin joint 165 includes a pair of axially spaced radial bearings 165a, 165b and a pair of axially spaced thrust bearings 165c, 165d which are arranged to permit rotation of the arm member 148 relative to the arm 121a of operation rod 121 about the rotational axis $L_3$ of bell crank 146. In this modification, the rotational axis $L_3$ of bell crank 146 is displaced in a distance from the axis $L_1$ of operation rod 121 to avoid interference between bell crank 146 and operation rod 121.

(3) In the modification shown in FIG. 5, an angle between the first link 47 and the first arm of bell crank 146 is determined in consideration with an angle between the axis $L_2$ of slider 43 and a line connecting opposite ends of arm member 148. With such arrangement of the bell crank 146, the axial movement amount of operation rod 121 in one direction from a neutral position can be made substantially equal to that of operation rod 121 in the opposite direction from the neutral position.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A four-wheel steering system for an automotive vehicle having a pair of dirigible front road wheels and a pair of dirigible rear road wheels, comprising:
   a front wheel steering mechanism operable in response to a steering operation to steer the front road wheels;
   a rear wheel steering mechanism including an operation rod axially movable in response to operation of said front wheel steering mechanism to steer the rear road wheels;
   a linkage arranged in a fore-and-aft direction of the vehicle and having one end drivingly connected to said front wheel, steering mechanism; and
   a connecting mechanism assembled in combination with said rear wheel steering mechanism and being drivingly connected to the other end of said linkage for effecting axial movement of the operation rod in response to operation of said front wheel steering mechanism;
   wherein said connecting mechanism comprises:
   a housing to be mounted on a body structure of the vehicle;
   a carrier rotatably mounted within said housing and being arranged to rotate about a first axis perpendicular to the longitudinal axis of said operation rod;

drive means mounted on said housing to effect rotary motion of said carrier about said first axis;

a bell crank rotatably mpunted on said carrier and arranged to rotate about a second axis in parallel with the longitudinal axis of said operation rod when said carrier is retained in a neutral position, said bell crank having a first arm extending therefrom at a predetermined angle to said first axis and a second arm extending therefrom along said first axis;

a first link having one end pivotally connected with the first arm of said bell crank and the other end operatively connected to said linkage to be moved along said first axis in response to operation of said front wheel steering mechanism; and a second link pivotally connected with the second arm of said bell crank and operatively connected to said operation rod.

2. A four-wheel steering system as claimed in claim 1, wherein said connecting mechanism further comprises a slider slidably mounted within said housing along said first axis and pivotally connected to the other end of said first link, said slider being thereby operatively connected to said linkage to be moved along said first axis in response to operation of said front wheel steering mechanism.

3. A four-wheel steering system as claimed in claim 1, wherein said rear wheel steering mechanism includes a pair of axially spaced operation rods axially movable in response to operation of said front wheel steering mechanism to steer the rear road wheels, and said bell crank is arranged to rotate about said second axis coaxial with the longitudinal axis of said operation rods when said carrier is retained in the neutral position, and wherein said second link has a central portion slidably and pivotally connected with the second arm of said bell crank and opposite ends each pivotally connected to said operation rods.

4. A four-wheel steering system as claimed in claim 1, wherein said connecting mechanism further comprises an input shaft rotatably mounted within said housing and being drivingly connected to said linkage to be rotated in response to operation of said front wheel steering mechanism, and a slider slidably mounted within said housing along said first axis and pivotally connected to the other end of said first link, said slider being thereby operatively connected to said input shaft to be reciprocated along said first axis in response to rotation of said input shaft.

5. A four-wheel steering system as claimed in claim 4, wherein a sector gear is arranged between said input shaft and said slider and pivotally mounted on said housing, said sector gear having a toothed portion in mesh with a rack portion of a ball nut mounted on said input shaft and another toothed portion in mesh with a rack portion formed on one side of said slider.

6. A four-wheel steering system as claimed in claim 1, wherein said second link has one end pivotally connected with the second arm of said bell crank and the other end rotatably connected with an arm portion of said operation rod to be moved along said second axis.

* * * * *

UNITED STATES PATENT AND TRADEMARK OFFICE
CERTIFICATE OF CORRECTION

PATENT NO. : 4,691,932

DATED : September 8, 1987

INVENTOR(S) : Hyodo

It is certified that error appears in the above-identified patent and that said Letters Patent is hereby corrected as shown below:

Column 6, line 55, delete "," after "wheel"; and

Column 7, line 3, change "mpunted" to -- mounted --.

Signed and Sealed this

Fifth Day of April, 1988

Attest:

DONALD J. QUIGG

Attesting Officer

Commissioner of Patents and Trademarks